United States Patent
Ciszek

(10) Patent No.: US 8,353,526 B2
(45) Date of Patent: Jan. 15, 2013

(54) AIR BAG ASSEMBLY WITH AIR BAG GUIDE SECURED BY MULTIPLE FASTENERS

(75) Inventor: Yves Ciszek, Velizy Villacoublay (FR)

(73) Assignee: Lear Corporation, Southfield, MI (US)

( * ) Notice: Subject to any disclaimer, the term of this patent is extended or adjusted under 35 U.S.C. 154(b) by 124 days.

(21) Appl. No.: 13/078,435

(22) Filed: Apr. 1, 2011

(65) Prior Publication Data

US 2012/0248748 A1     Oct. 4, 2012

(51) Int. Cl.
     *B60R 21/16*     (2006.01)
(52) U.S. Cl. ............... 280/728.2; 280/728.3; 280/730.2
(58) Field of Classification Search ............... 280/728.1, 280/728.2, 728.3, 730.2
     See application file for complete search history.

(56) References Cited

U.S. PATENT DOCUMENTS

| | | | |
|---|---|---|---|
| 5,967,603 A | 10/1999 | Genders et al. | |
| 6,045,151 A | 4/2000 | Wu | |
| 6,450,528 B1 * | 9/2002 | Suezawa et al. | 280/730.2 |
| 6,612,610 B1 * | 9/2003 | Aoki et al. | 280/730.2 |
| 6,976,700 B2 * | 12/2005 | McCann et al. | 280/728.2 |
| 7,325,825 B2 | 2/2008 | Tracht | |
| 7,434,832 B2 * | 10/2008 | Umehara | 280/730.2 |
| 7,621,557 B2 | 11/2009 | Tracht et al. | |
| 7,695,004 B2 * | 4/2010 | Inoue | 280/730.2 |
| 7,798,523 B2 * | 9/2010 | Shigemura | 280/730.2 |
| 7,931,294 B2 * | 4/2011 | Okada et al. | 280/730.2 |
| 2004/0090049 A1 * | 5/2004 | McCann et al. | 280/728.2 |
| 2006/0108777 A1 * | 5/2006 | Mabuchi et al. | 280/730.2 |
| 2006/0113765 A1 | 6/2006 | Tracht | 280/730.2 |
| 2006/0163850 A1 * | 7/2006 | Inazu et al. | 280/730.2 |
| 2006/0220358 A1 * | 10/2006 | Umehara | 280/730.2 |
| 2008/0111405 A1 | 5/2008 | Tracht et al. | |
| 2008/0129021 A1 | 6/2008 | Bozintan et al. | |
| 2011/0095513 A1 * | 4/2011 | Tracht et al. | 280/730.2 |

FOREIGN PATENT DOCUMENTS

DE     102006007301 A1     8/2007

* cited by examiner

*Primary Examiner* — Toan To
(74) *Attorney, Agent, or Firm* — Brooks Kushman P.C.

(57) ABSTRACT

A vehicle seat may include a seat back having a frame, a trim cover disposed on the seat back that includes a deployment seam, and an air bag module having an inflator and an air bag. The air bag may be configured to be inflated by the inflator to sever and deploy through the deployment seam. The air bag module may include a mounting stud that extends through the frame, first and second mounting nuts threaded onto the mounting stud to secure the air bag module to the frame, and an air bag guide. The air bag guide may have a first end located adjacent to the deployment seam and a second end disposed opposite the first end. The second end may engage and be disposed between the first and second mounting nuts.

17 Claims, 5 Drawing Sheets

AIR BAG ASSEMBLY WITH AIR BAG GUIDE SECURED BY MULTIPLE FASTENERS

TECHNICAL FIELD

Various embodiments relate to an air bag assembly. In some embodiments, the air bag assembly may include an air bag guide secured by multiple fasteners.

BACKGROUND

Vehicle seat components have previously included side air bag modules and conventionally include trim covers that have an air bag release seam through which an air bag upon deployment is projected outwardly from within the seat to provide occupant protection. Different constructions have been utilized to permit passage of the air bag past the foam seat padding when inflated by an inflator for movement from within the seat component outwardly through the trim cover release seam.

One example of a construction is disclosed in U.S. Pat. No. 7,621,557 to Tracht et al. ('557 patent). The '557 patent discloses a vehicle seat component including a side air bag module mounted on a frame within a trim cover that also covers a seat pad. An air bag guide includes flexible inner and outer panels that extend between a release seam of the trim cover and the air bag module to provide a guiding function to an air bag upon inflation so as to project outwardly through the release seam for use. An inner extremity of the flexible inner panel of the air bag guide has a grommet that is secured to a frame by a threaded stud and a nut that also mounts the air bag module on the frame, and the inner extremity of the flexible outer panel is secured in any suitable manner to the seat component.

Another example is disclosed in U.S. Publication No. 2008/0129021 to Bozintan et al. ("Bozintan Publication"). The Bozintan Publication discloses an airbag deployment device. An airbag system for a vehicle seat has an airbag module coupled to a vehicle seat frame by a fastener assembly and substantially surrounded by a force cloth. An isolator is substantially disposed between the force cloth and the frame. The isolator generally includes a sheet of material and a spacer positioned, in proximity to the fastener assembly, between the airbag module and seat frame.

Other examples include U.S. Pat. No. 7,325,825 to Tracht; U.S. Pat. No. 6,045,151 to Wu; U.S. Pat. No. 5,967,603 to Genders et al.; and U.S. Publication No. 2008/0111405 to Tracht et al.

SUMMARY

One aspect is directed to a vehicle seat. The vehicle seat may have a seat back. Further, the seat back may have a frame. The vehicle seat may also include a trim cover disposed on the seat back that includes a deployment seam.

The vehicle seat may also include an air bag module. The air bag module may have an inflator and an air bag which may be configured to be inflated by the inflator. The air bag may sever and deploy through the deployment seam. The air bag module may include a mounting stud that extends through the frame. Additionally, the air bag module may include first and second mounting nuts threaded onto the mounting stud. The first and second mounting nuts may secure the air bag module to the frame. The air bag module may also include an air bag guide having a first end located adjacent to the deployment seam and a second end disposed opposite the first end. The second end may engage and be disposed between the first and second mounting nuts.

In some embodiments, the second end may include a washer that is disposed between the first and second mounting nuts. The second end may wrap at least partially around the washer such that the washer is separated from the first and second mounting nuts by the second end. Further, the second end may include stitching that extends through the air bag guide to secure the washer to the second end. The washer may be spaced apart from the frame.

In some embodiments, the vehicle seat include a support frame that may be disposed on the frame rearward of the air bag module. The support frame ma have a free end and may be configured such that the air bag guide is disposed between and engages the free end and the frame. An end of the trim cover opposite from the deployment seam may be mounted to the support frame. Further, the free end may be disposed between the trim cover and the air bag guide.

In some embodiments, the first nut may engage the frame and the second nut may be spaced apart from the frame.

In another aspect, a vehicle seat may include a seat back having a frame, a support frame disposed on the frame at a rear side of the seat back, and an air bag module. The air bag module may have an inflator and an air bag that is configured to be inflated by the inflator to deploy outwardly from the vehicle seat.

The air bag module may include a housing that receives the air bag, a mounting stud that extends from the inflator through the housing and the frame, and first and second mounting nuts threaded onto the mounting stud. The first and second mounting nuts may secure the air bag module to the frame such that the first mounting nut may engage the frame and the second mounting nut may be spaced apart from the first mounting nut.

The vehicle seat may also include a trim cover which may provide an exterior surface of the vehicle seat. The trim cover may have first and second panels that are stitched together at a deployment seam that is configured to sever upon deployment of the airbag. The first panel may have a first end disposed at the deployment seam and a second end that engages the support frame.

The vehicle seat may also include an air bag guide disposed under the trim cover. The air bag guide may have a first end disposed proximate the deployment seam and a second end disposed opposite the first end that is disposed between the first and second mounting nuts. The trim cover may be spaced apart from the air bag guide where the support frame is disposed between the trim cover and the air bag guide and the air bag guide is not disposed between the housing and the frame.

The second end of the trim cover may be coupled to the support frame with a threaded fastener. Further, the second end of the air bag guide may comprise at least two panels. At least one panel may be disposed between the first and second mounting nuts. The second panel may be secured to the support frame and under the trim cover. The second end may also include a washer disposed between the first and second mounting nuts. The second end may wrap around the washer such that the washer is spaced apart from the first and second mounting nuts. Further, the second end may include a substantially linear stitch seam that couples the second end to itself to secure the washer.

The air bag guide may be disposed underneath and engage the trim cover between the deployment seam and the air bag module. The trim cover may be separated from the air bag guide by a seat pad in a region disposed rearward of the air bag module. Further, the air bag guide may engage and be disposed between the trim cover and the frame proximate the support frame.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
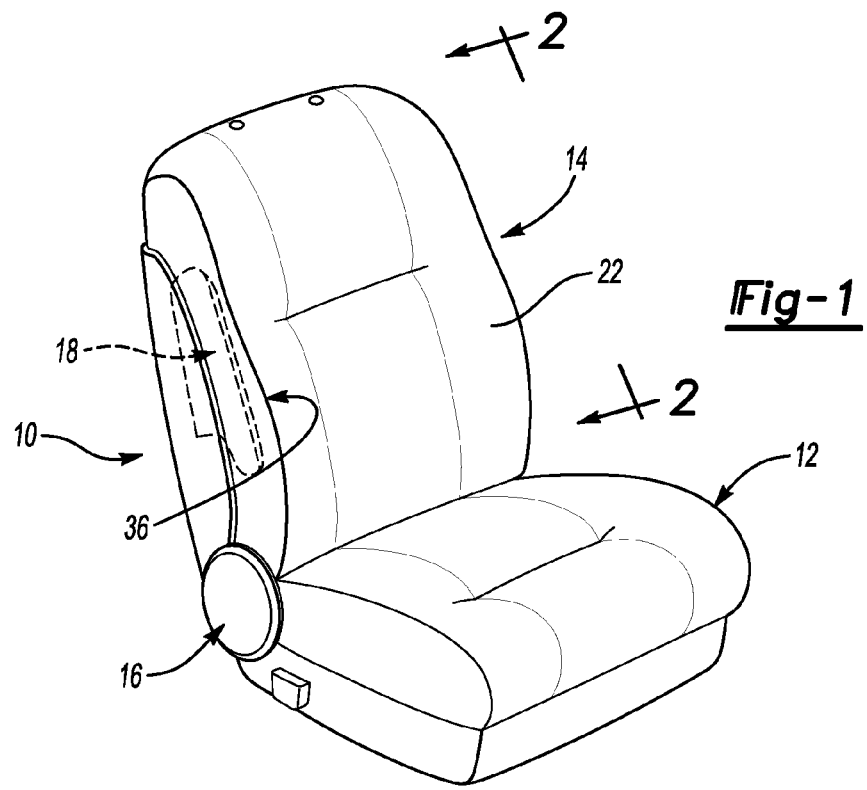
FIG. 1 is a perspective view of a vehicle seat including a seat back component constructed in accordance with the invention to include a side air bag module that is shown by hidden line illustration.
Figure 2:
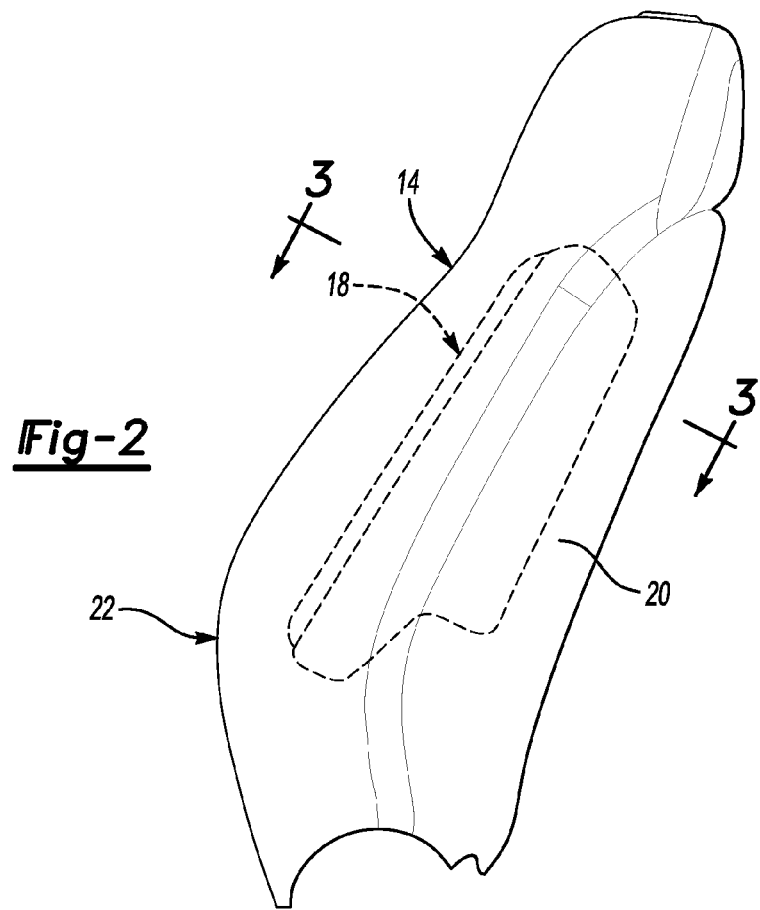
FIG. 2 is a side elevational view of the vehicle seat back component taken along the direction of line 2-2 in FIG. 1 with the side air bag module thereof also illustrated by hidden line representation.

With reference to FIG. 1 of the drawings, a vehicle seat generally indicated by 10 includes a seat bottom 12 for mounting on a vehicle floor 30 and a seat back 14 mounted in a generally upstanding manner on the seat bottom with its angular position controlled in a conventional manner by a recliner generally indicated by 16. The seat back component 14 includes a side air bag module 18 that is operable to provide seat occupant protection. While the side air bag module 18 is shown on the seat back 14, which is a usage for which it has particular utility, it is also possible for the side air bag module to be utilized with a seat bottom 12 even though the seat back usage is specifically disclosed. Also, as illustrated, the side air bag module 18 is located at an outboard lateral side or extremity of the seat to provide protection against adjacent vehicle structure, but it is also possible to have the side air bag module located at the inboard lateral side to provide protection against an adjacent vehicle occupant and to also have side air bag modules at both outboard and inboard locations for protection in both lateral directions. As shown in FIG. 2, the seat back 14 includes a back panel 20 that is conventionally molded from plastic and also includes a front cushion 22 against which the seat occupant leans to provide back support and in which the side air bag module 18 is located.

Figure 3:
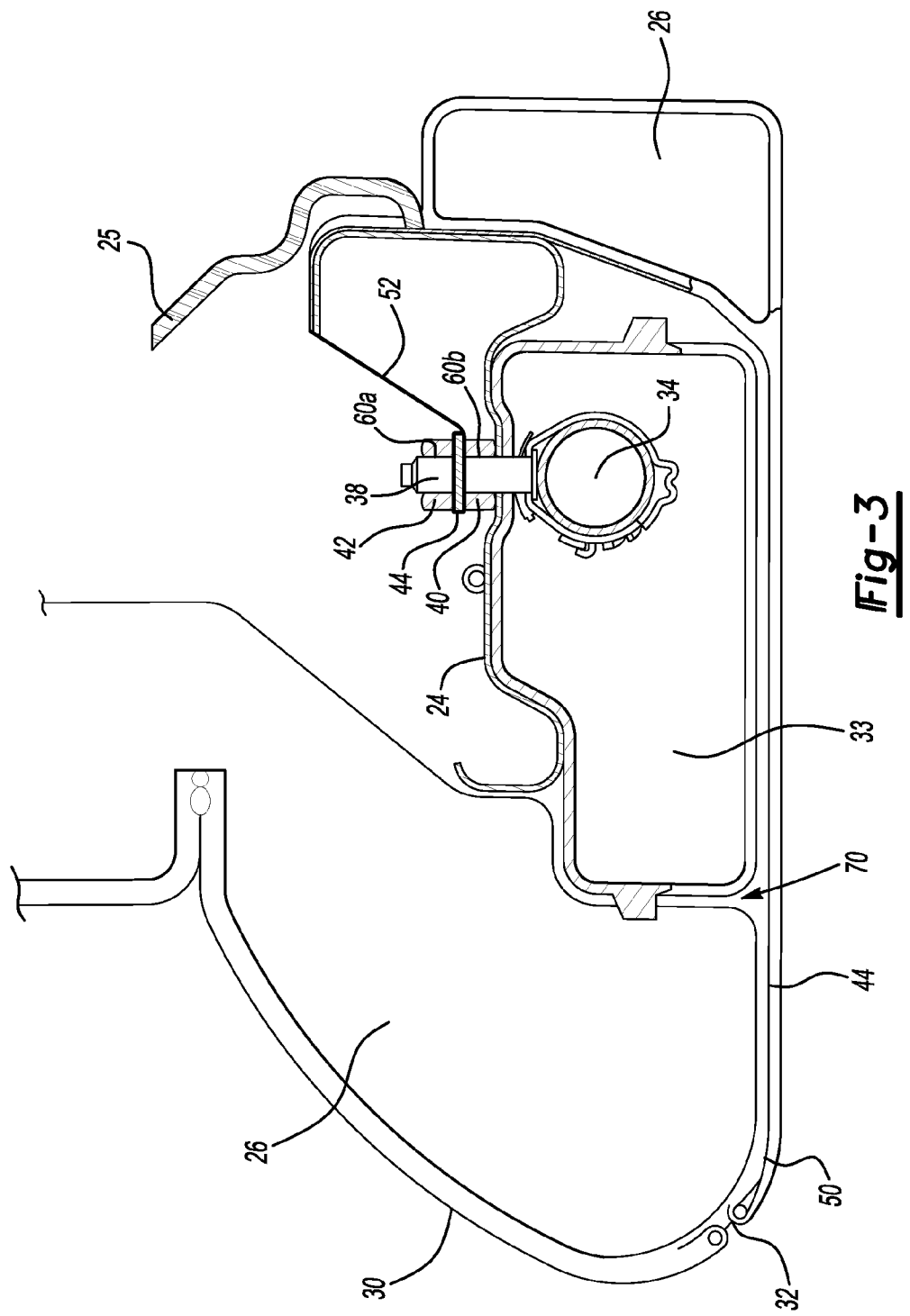
FIG. 3 is a sectional view taken through the seat back component along the direction of line 3-3 in FIG. 2 to further illustrate the construction of the side air bag module and an air bag guide within the seat back component.

As shown in FIG. 3, the seat back component 14 includes a frame collectively identified by 24. Additionally, the seat back component 14 may include a seat back support frame 25. The seat back support frame 25, in one embodiment, may be made of a plastic material. In some embodiments, the frame 25 may have a free end and the air bag guide may be disposed between and engage the free end and the frame.

A foam seat pad 26 is mounted on the frame 24 in any conventional manner and has opposite side extremities 28 (only one shown) spaced laterally from each other at the opposite lateral sides of the seat. A trim cover with a single panel and, in some embodiments, at least two panels, generally indicated by 30 extends over the seat pad 26 and includes an air bag release seam 32 adjacent the one shown seat pad side extremity 28 which corresponds to an outboard location. At least one panel of the trim cover 30 may be disposed proximate to the deployment seam 32 and the second panel may engage the frame 24. The trimming 30 may be coupled to the frame 24 using a threaded fastener, such as a screw. In some embodiments, trimming 30 may be clipped to frame 24 with extruded plastic profiles.

The side air bag module 18 is located within the trim cover 30 mounted on the frame 24, as described below, adjacent but in a spaced relationship from the trim cover release seam 32. The air bag module 18 includes a housing 33 and an inflator 34 and a schematically illustrated folded or rolled stored air bag 36 which, upon deployment, is inflated by the inflator to project outwardly from the seat component through the air bag release seam 32 of the trim cover 30. The air bag module 18 also includes at least one threaded mounting stud or bolt 38 that extends through a hole in the frame 24. The air bag module further includes at least two mounting fasteners 40 and 42 threaded onto the bolt 38 to secure the air bag module to the frame.

With continuing reference to FIG. 3, an air bag guide of the seat back component is generally indicated by 44. The air bag guide (also referred to herein as a "concentrator") 44 may include an inner panel and an outer panel that are each made of a flexible material such as a suitable cloth. Further, the concentrator 44 may have a first extremity 50 adjacent the air bag release seam 32 and a second extremity 52 which is hereinafter more fully described.

Figure 4:
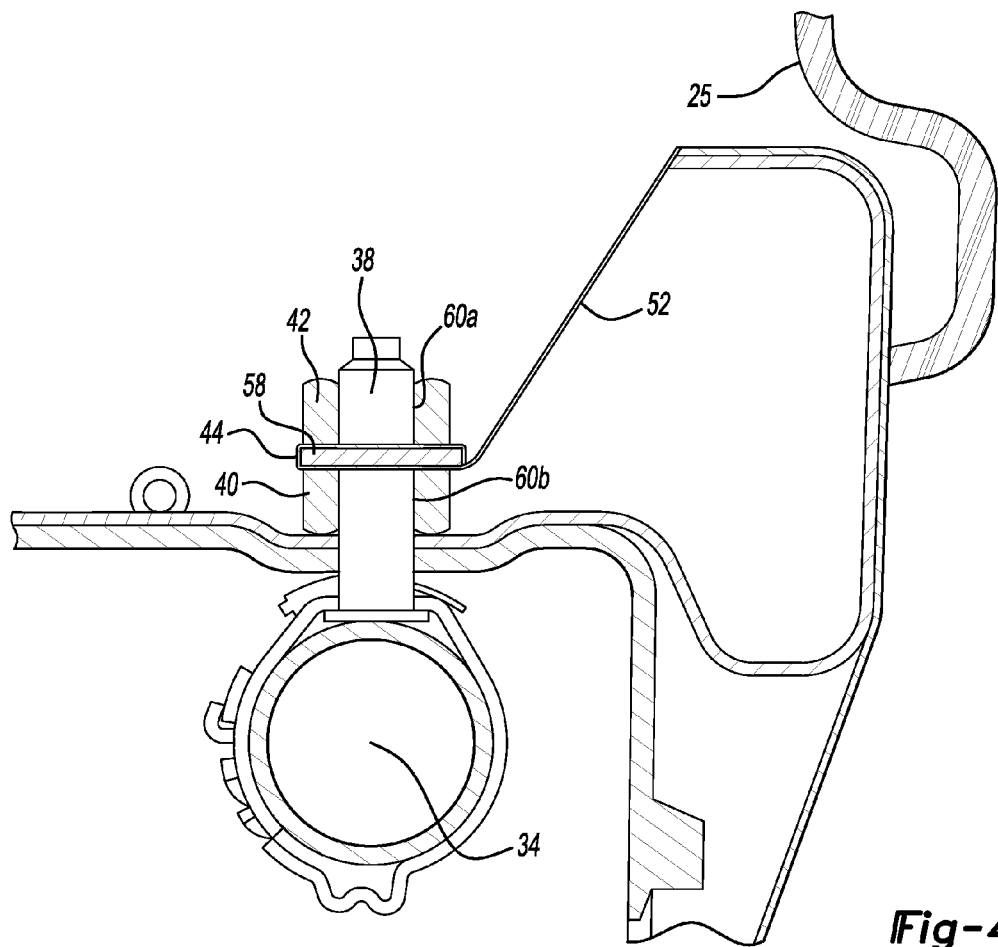
FIG. 4 is an enlarged view of the portion of FIG. 3 illustrating a concentrator secured to an airbag module with multiple nuts and a bolt within a vehicle seat frame.
Figure 5:
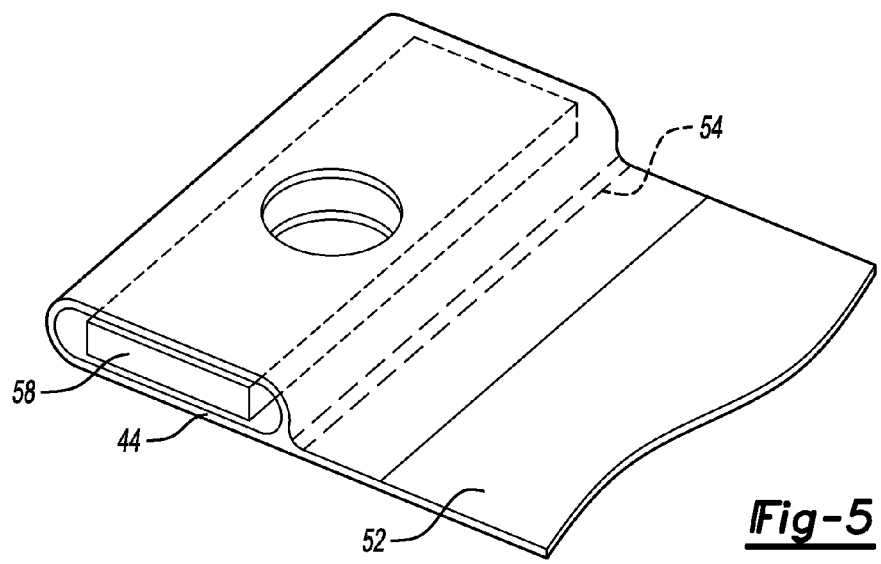
FIG. 5 illustrates a portion of the concentrator that is secured to the air bag module and having a reinforcing plastic washer.

As shown in FIGS. 3 and 4, a second extremity 52 (also referred to herein as an "end") of the concentrator 44 may be secured between a first nut 40 and a second nut 42. The air bag module stud 38 may extend through the frame 24 and through the holes 60a, 60b of each nut, respectively. The nuts 40, 42 may be in contact with each to provide securement of the concentrator 44. A washer 58 may be used for reinforcement. In some embodiments, the washer 58 may be of a plastic material. As shown in FIG. 5, extending from the second end 52, the concentrator 44 may be wrapped around the reinforcement 58 and sewed or stitched at sewing line 54. The stitching, which may be substantially linear, may extend through the air bag guide 44 to secure the washer to the second end 52. Further, at least one nut may be disposed between the frame and the washer 58 such that the washer may be spaced apart from the frame. In some embodiments, the washer 58 may be disposed between at least one of nuts 40 and 42. Of course, it is also possible to otherwise secure the wrap of the concentrator 44 around the washer 58 in any other suitable manner and at other locations than the one shown.

Figure 6:
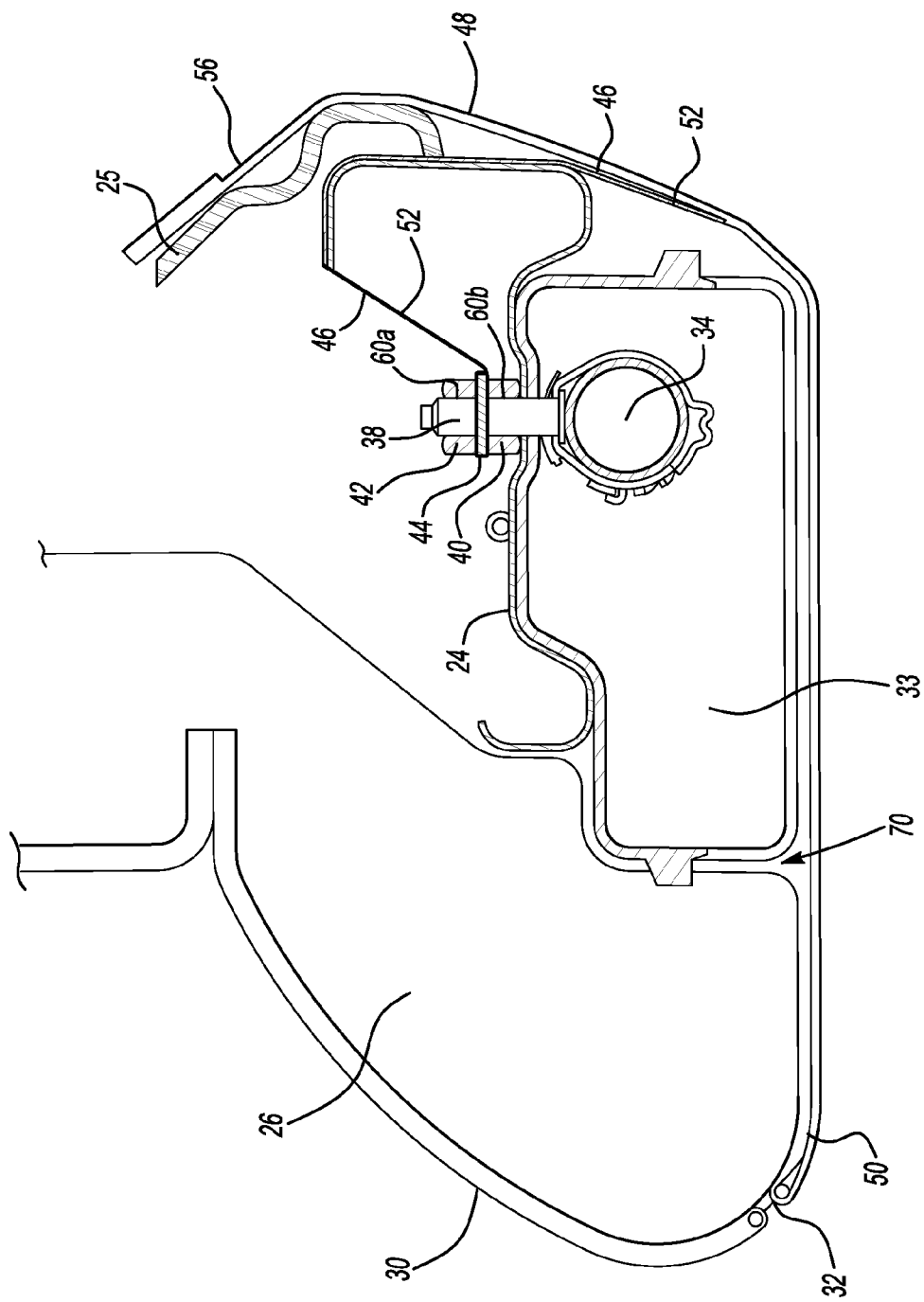
FIG. 6 is a view similar to FIG. 3 illustrating an alternative embodiment for securing the concentrator to the air bag module.

In another embodiment shown in FIG. 6, the inner panel 46 and the outer panel 48 of the concentrator 44 are clearly illustrated. In the non-limiting embodiment of FIG. 6, the inner and outer panels are unitary at the first extremity 50 and spaced apart at the second extremity 52 of the concentrator 44. The inner panel 46 of the concentrator 44 may be secured between the first nut 40 and the second nut 42 as described above. The outer panel 48 having extremity 56 may be engaged to the rear frame 25 at the extremity 56 by a connector 62 of any suitable type including, but not limited to, a screw. It is also possible to otherwise secure the extremity 56 of the outer panel 48 to the seat in any other suitable manner at other locations than the one shown. Outer panel 48 may be covered by trimming 30 which may be disposed over top of and in a spaced relationship with concentrator 44. The trimming 30 may be coupled to the support frame 25 using a threaded fastener, such as a screw.

In another non-illustrated embodiment, the second extremity 52 may be secured to the seat back frame 24 using a connector that secures the concentrator 44 in any suitable manner to the frame 24 such as by a hook type construction. Further, the third extremity 56 may be secured to the rear frame 24 as described above. It is also possible to otherwise secure the concentrator 44 to the seat in any other suitable manner at other locations.

Figure 7:
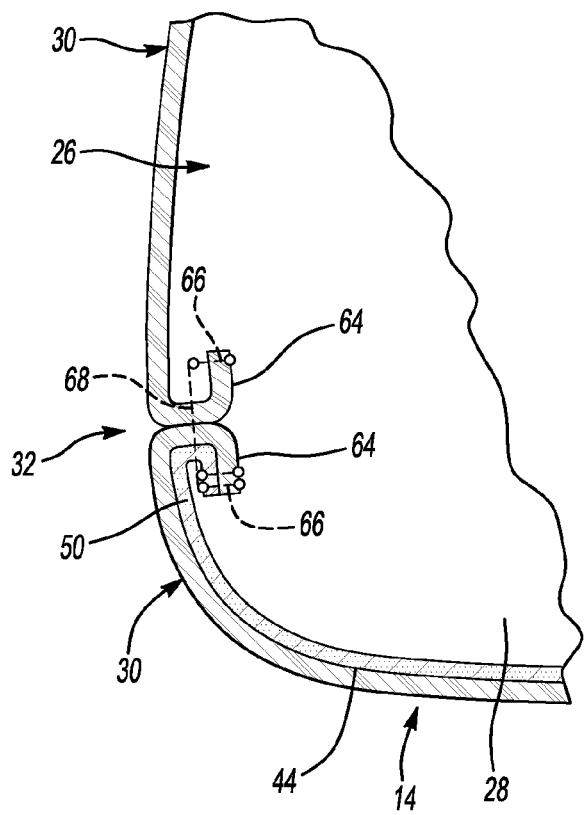
FIG. 7 is enlarged view of a portion of FIG. 3 illustrating an air bag release seam of a trim cover of the seat back component.

Referring now to FIG. 7, the air bag release seam 32 includes bent seam ends 64 of the trim cover 30 and the extremity 50 of the concentrator 44. Stitching 66 may provide securement of the flexible panel extremity 50 to the trim cover 30 and stitching 66 may provide securement of the bent ends 64 to each other.

From the air bag release seam 32 illustrated in FIG. 3, the concentrator 44 extends to the side air bag module 18 and thence alongside the module 18 for connection within the seat back component as previously described. Upon deployment of the side air bag module 18, the air bag 36 fractures a housing seam 70 and moves out of the housing 33. The air bag 36 is then guided by the concentrator 44 toward the air bag release seam 32 and eventually tears open the release seam for outward projection of the air bag to provide the occupant protection.

The air bag guide 44 may be made of any suitable flexible material effective to guide the air bag 36 from the module 18 to the release seam 32. For example, and without limitation, the material may be a woven or non-woven cloth material including, but not limited to, natural materials or a synthetic material such as nylon. As another example, the material may be a polyester material of the type from which the air bag 36 may be manufactured. Regardless of the type of material used to make the air bag guide 44, the use of the air bag guide can be helpful in reducing friction on the air bag 36 as it is deployed. Although a polymer such as nylon may be particularly beneficial, even a fleece material will help reduce the friction on the air bag 36 because the air bag guide 44 prevents contact between the deploying air bag 36 and the seat pad 26.

Figure 8:
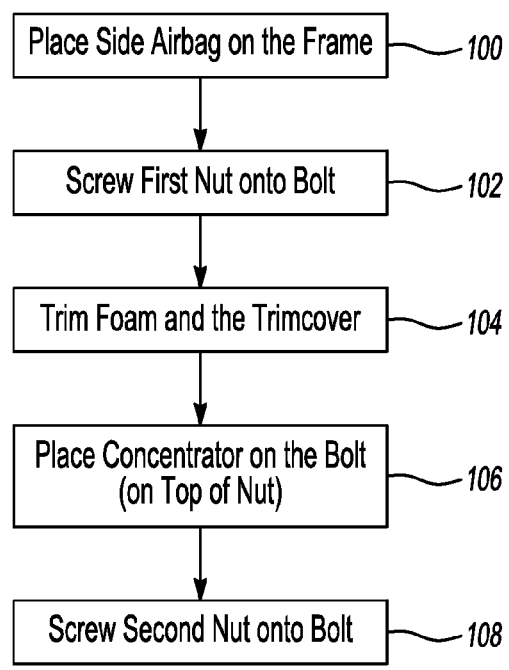
FIG. 8 is a process for securing the concentrator to the air bag module.

Referring now to FIG. 8, the process for attaching the air bag module 18 to the seat is illustrated. As represented by block 700, the side airbag module 18 is placed on the frame 24. A first nut (e.g., nut 40) is screwed onto the bolt 38 (block 102).

The foam 26 and the trim cover 30 may be trimmed (block 104). The concentrator 44 is placed on the bolt 38, e.g., on top of the nut 40 (block 106). The second nut (e.g., nut 42) is screwed onto the bolt (block 108).

While the side air bag module 18 described above has particular utility for use with a vehicle seat back, especially at its outboard location, it is also possible for the side air bag to be utilized with other vehicle seat components such as with a seat bottom.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat comprising:
   a seat back having a frame;
   a trim cover disposed on the seat back that includes a deployment seam;
   an air bag module having an inflator and an air bag that is configured to be inflated by the inflator to sever and deploy through the deployment seam, the air bag module further including:
   a mounting stud that extends through the frame;
   first and second mounting nuts threaded onto the mounting stud to secure the air bag module to the frame; and
   an air bag guide having a first end located adjacent to the deployment seam and a second end disposed opposite the first end that engages and is disposed between the first and second mounting nuts.

2. The vehicle seat of claim 1 wherein the second end further comprises a washer that is disposed between the first and second mounting nuts.

3. The vehicle seat of claim 2 wherein the second end wraps at least partially around the washer such that the washer is separated from the first and second mounting nuts by the second end.

4. The vehicle seat of claim 3 wherein the second end includes stitching that extends through the air bag guide to secure the washer to the second end.

5. The vehicle seat of claim 2 wherein the washer is spaced apart from the frame.

6. The vehicle seat of claim 1 further comprising a support frame disposed on the frame rearward of the air bag module, wherein the support frame has a free end and is configured such that the air bag guide is disposed between and engages the free end and the frame.

7. The vehicle seat of claim 6 wherein an end of the trim cover opposite from the deployment seam is mounted to the support frame.

8. The vehicle seat of claim 7 wherein the free end is disposed between the trim cover and the air bag guide.

9. The vehicle seat of claim 1 wherein the first nut engages the frame and the second nut is spaced apart from the frame.

10. A vehicle seat comprising:
    a seat back having a frame;
    a support frame disposed on the frame at a rear side of the seat back;
    an air bag module having an inflator and an air bag that is configured to be inflated by the inflator to deploy outwardly from the vehicle seat, the air bag module further including:
    a housing that receives the air bag;
    a mounting stud that extends from the inflator through the housing and the frame; and
    first and second mounting nuts threaded onto the mounting stud to secure the air bag module to the frame such that the first mounting nut engages the frame and the second mounting nut is spaced apart from the first mounting nut;
    a trim cover that provides an exterior surface of the vehicle seat, the trim cover having first and second panels that are stitched together at a deployment seam that is configured to sever upon deployment of the airbag, the first panel having a first end disposed at the deployment seam and a second end that engages the support frame; and an air bag guide disposed under the trim cover, the air bag guide having a first end disposed proximate the deployment seam and a second end disposed opposite the first end that is disposed between the first and second mounting nuts;

wherein the trim cover is spaced apart from the air bag guide where the support frame is disposed between the trim cover and the air bag guide and the air bag guide is not disposed between the housing and the frame.

11. The vehicle seat of claim 10 wherein the second end of the trim cover is coupled to the support frame with a threaded fastener.

12. The vehicle seat of claim 10 wherein the second end of the air bag guide comprises at least two panels wherein at least one panel is disposed between the first and second mounting nuts and the second panel is secured to the support frame and under the trim cover.

13. The vehicle seat of claim 10 wherein the support frame is spaced apart from the mounting stud.

14. The vehicle seat of claim 10 wherein the second end of the air bag guide further comprises a washer disposed between the first and second mounting nuts.

15. The vehicle seat of claim 14 wherein the second end of the air bag guide wraps around the washer such that the washer is spaced apart from the first and second mounting nuts.

16. The vehicle seat of claim 15 wherein the second end of the air bag guide includes a substantially linear stitch seam that couples the second end to itself to secure the washer.

17. The vehicle seat of claim 13 wherein the air bag guide is disposed underneath and engages the trim cover between the deployment seam and the air bag module, the trim cover is separated from the air bag guide by a seat pad in a region disposed rearward of the air bag module, and the air bag guide engages and is disposed between the trim cover and the frame proximate the support frame.

* * * * *